Jan. 15, 1957 R. A. MULLER 2,777,126
APPARATUS FOR ASSEMBLING PLYWOOD BOXES
Filed Feb. 18, 1954 7 Sheets-Sheet 1
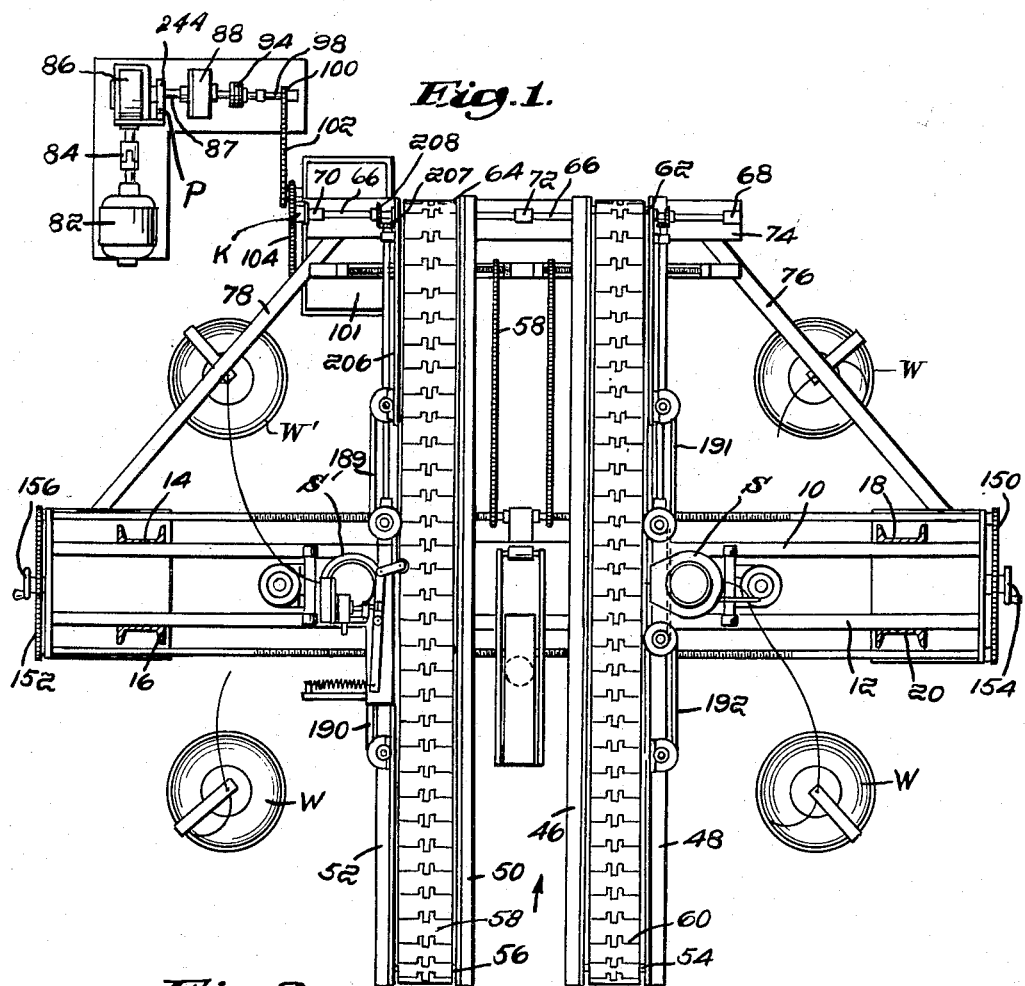
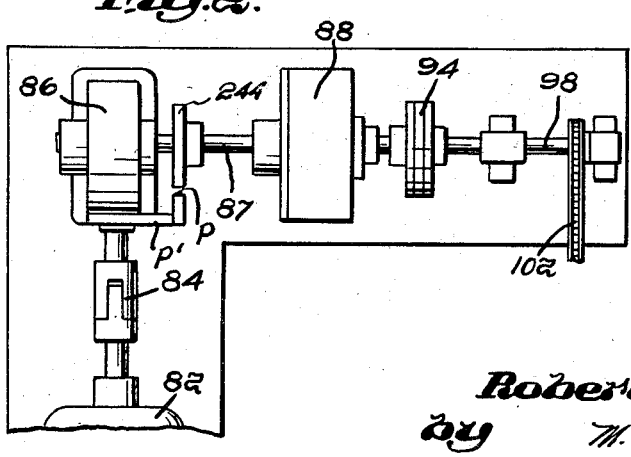
Inventor:
Robert A. Muller,
by M. H. Hamilton
Attorney

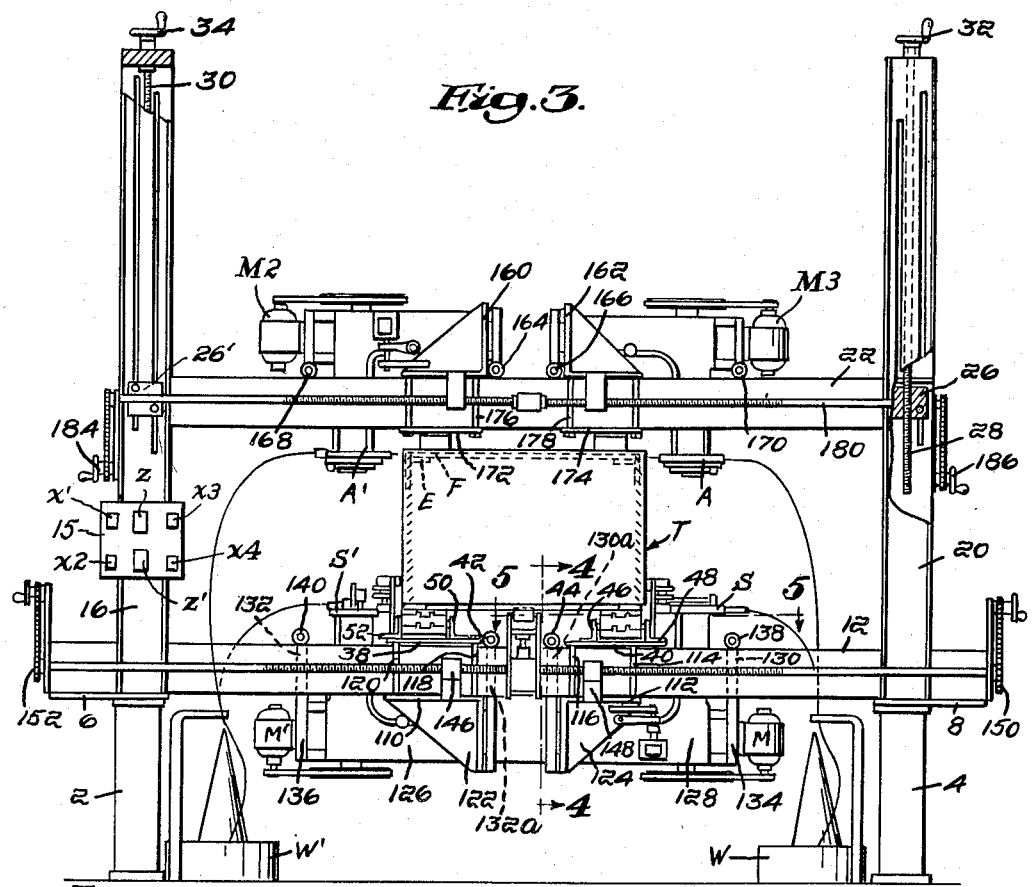

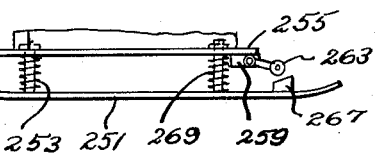
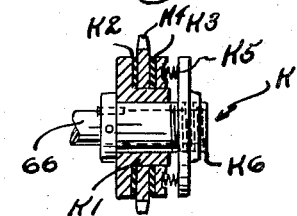
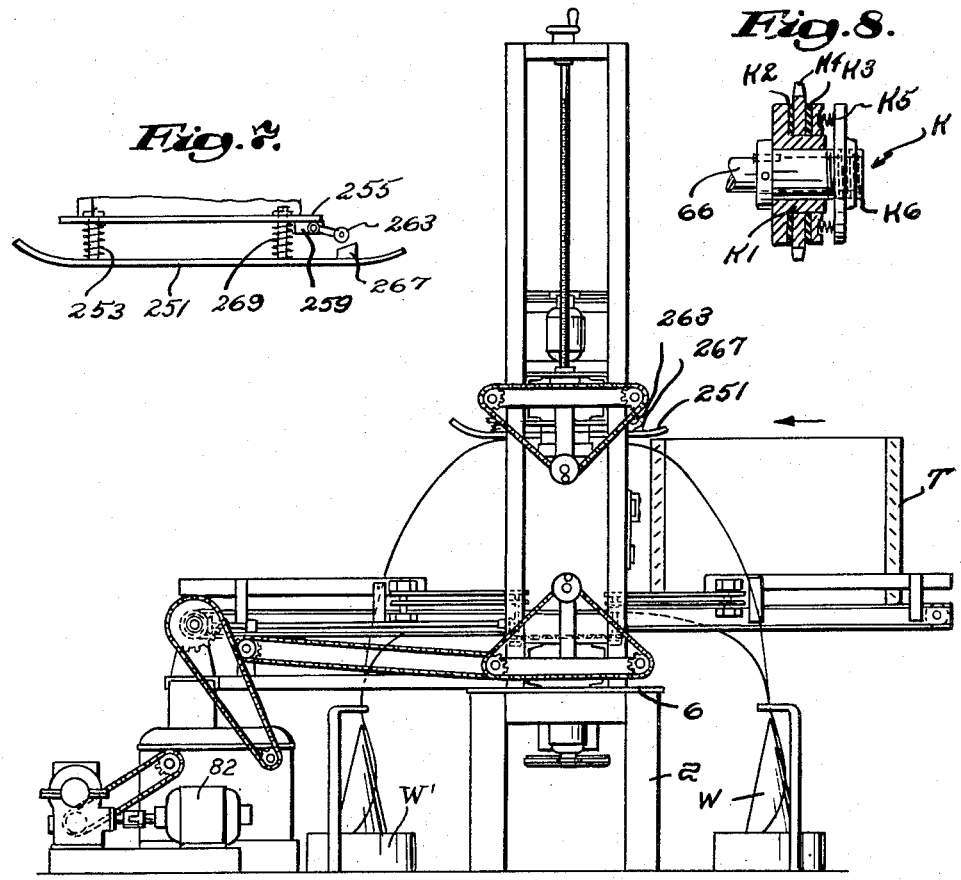
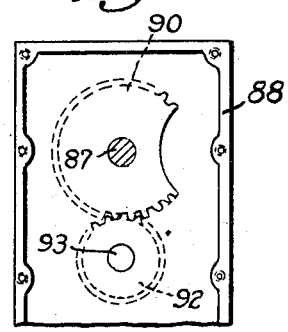
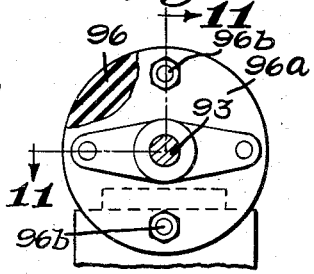
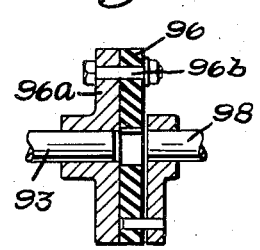

Jan. 15, 1957  R. A. MULLER  2,777,126
APPARATUS FOR ASSEMBLING PLYWOOD BOXES
Filed Feb. 18, 1954  7 Sheets-Sheet 4
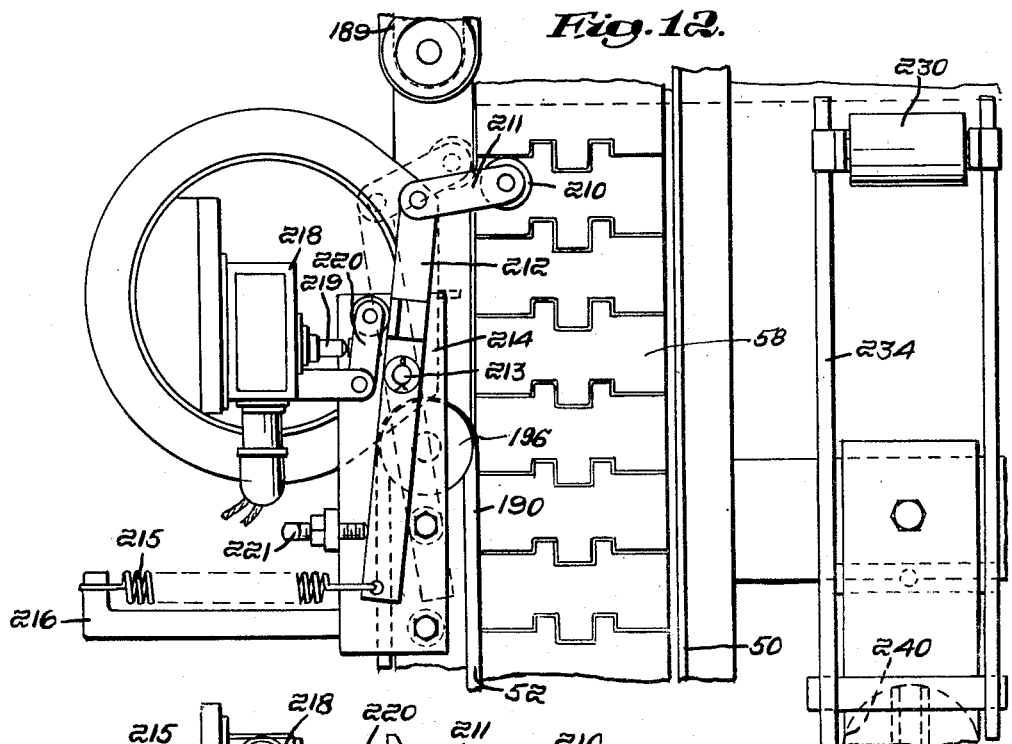
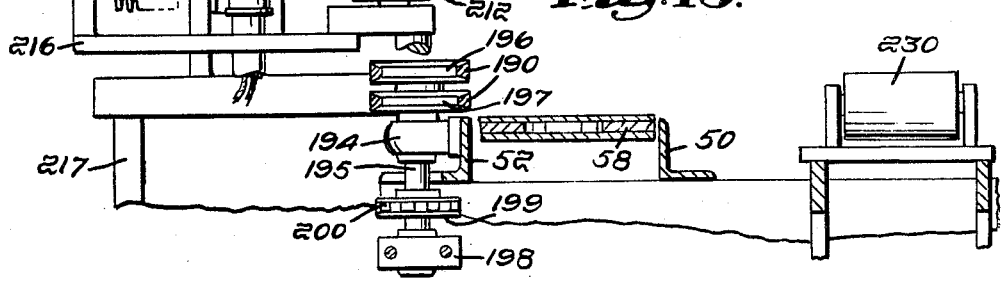
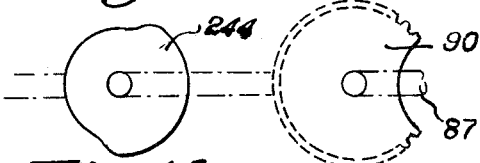
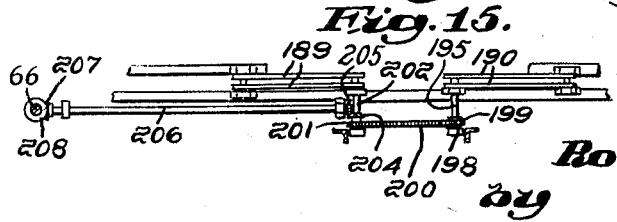

Jan. 15, 1957  R. A. MULLER  2,777,126
APPARATUS FOR ASSEMBLING PLYWOOD BOXES
Filed Feb. 18, 1954  7 Sheets-Sheet 5
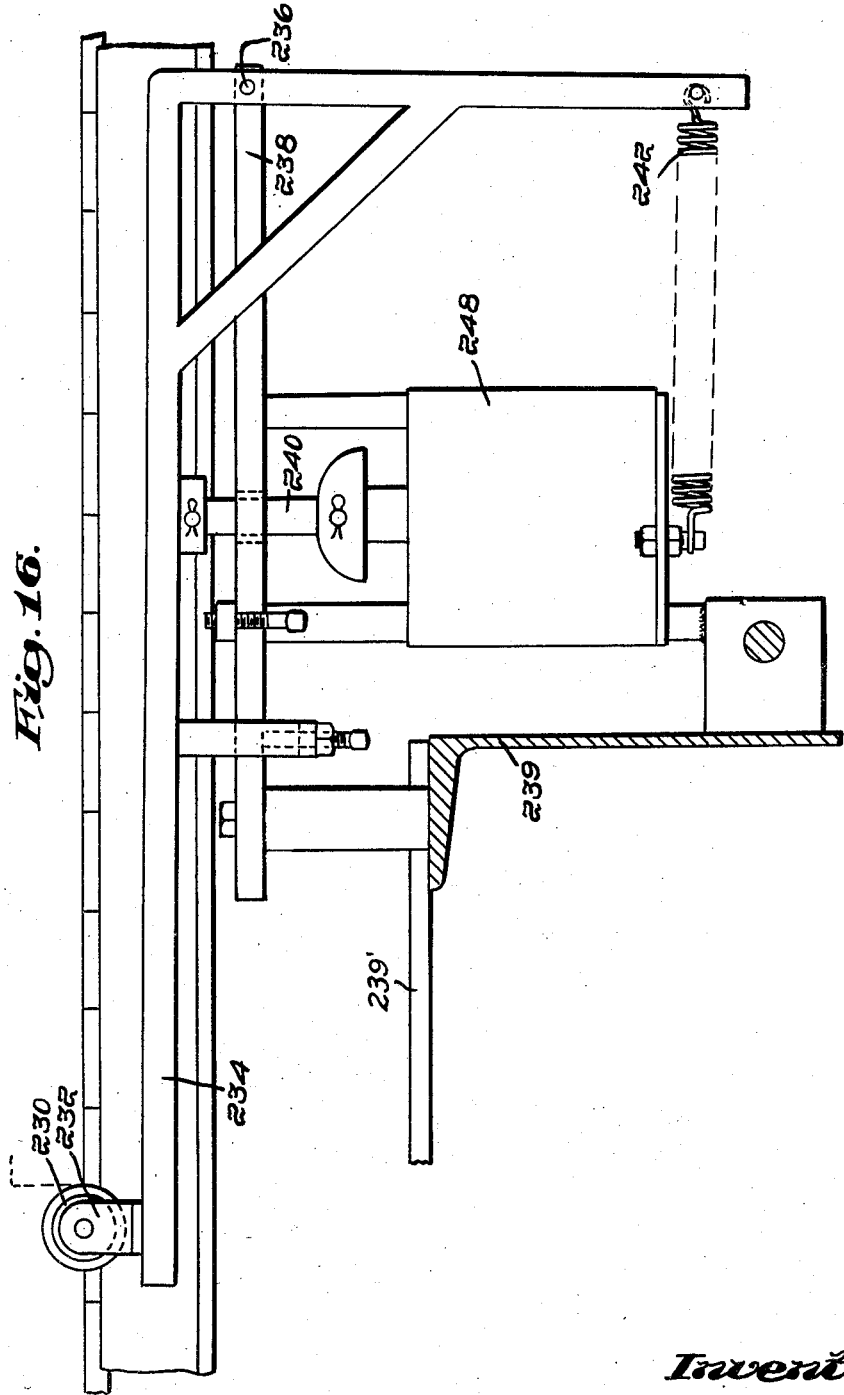
Inventor:
Robert A. Muller,
by M. H. Hamilton
Attorney

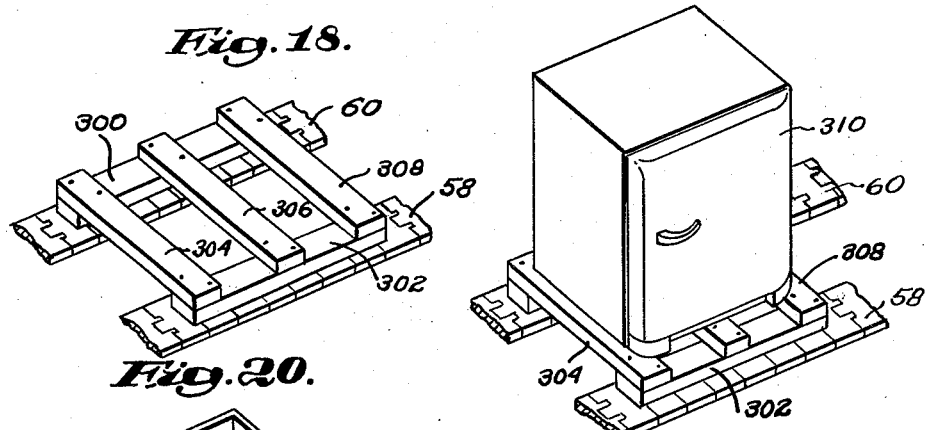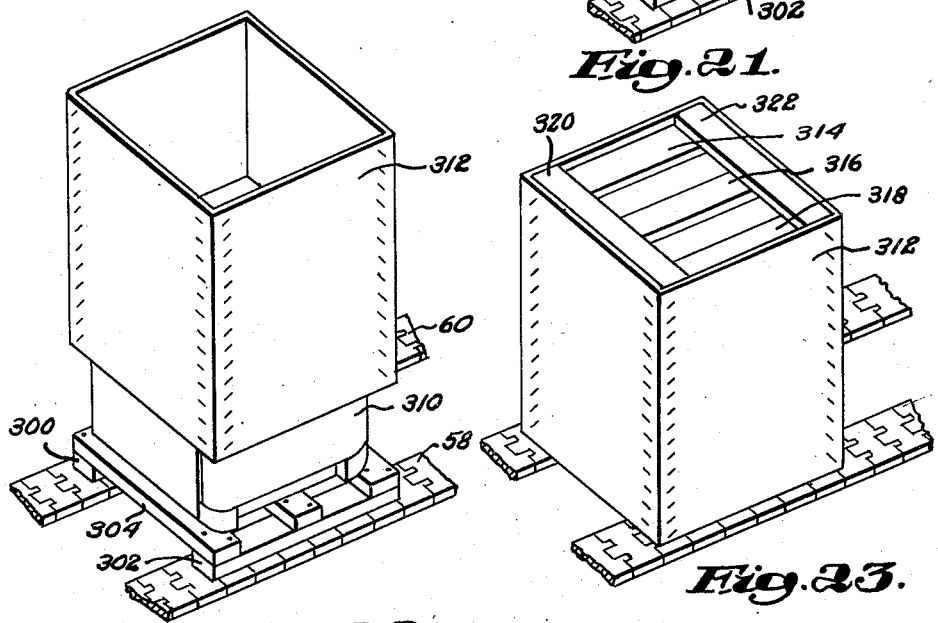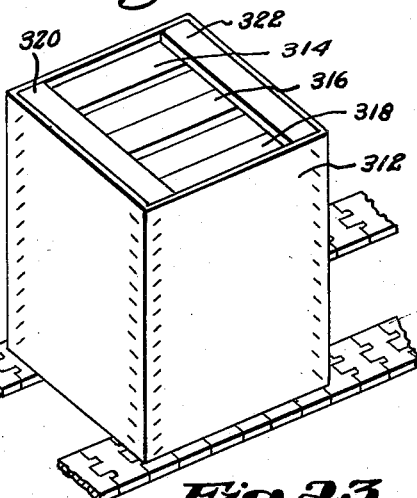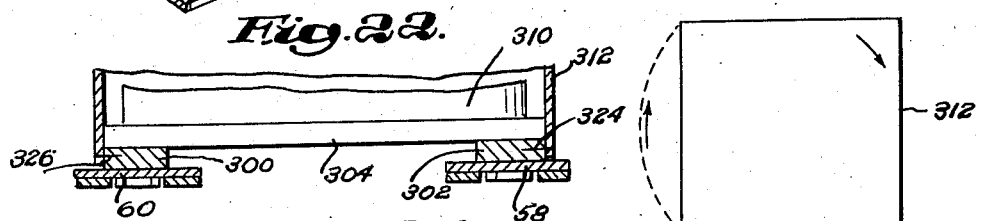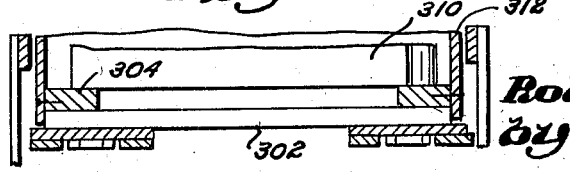

United States Patent Office 2,777,126
Patented Jan. 15, 1957

2,777,126

APPARATUS FOR ASSEMBLING PLYWOOD BOXES

Robert A. Muller, New London, N. H., assignor to Atlas Plywood Corporation, Boston, Mass., a corporation of Massachusetts Application February 18, 1954, Serial No. 411,120

11 Claims. (Cl. 1—106)

This invention relates to a machine for assembling and securing packing cases of the general class dealt with in my earlier U. S. Patent No. 2,558,874, issued July 3, 1951, wherein I have disclosed a mechanism for fabricating a plywood panel type packing case. Such a packing case is composed, in part, of a plurality of plywood panels which are stapled together with their adjacent edges occurring in hinged relationship so as to form a substantially tubular body. This tubular body is conveniently packaged in a collapsed condition, together with separate cleated top and bottom box sections. When a box is to be assembled, the tubular body may be quickly opened and secured to the bottom and top sections noted to thereby form a rigid packing case. The present application is a continuation of my copending application, Serial No. 323,102, filed November 28, 1952.

In connection with manufacture and sale of packing cases of the character indicated, it has been found that the cleated bottom section referred to may conveniently be secured to certain classes of goods during or immediately after the assembly of such goods. The tubular plywood body may, at this point, be passed down over the merchandise and into snugly fitted relationship with the bottom section, and staples, nails or other fastenings may then be applied. I have found that such steps make possible novel assembly operations which are convenient and fast and which may eliminate procedures and equipment now commonly resorted to in the course of crating heavy merchandise.

It is, in general, an object of the present invention to devise improved apparatus for assembling boxes and for securing together the component parts of boxes of the class indicated, particularly with merchandise assembled therein in readiness for shipping.

These and other objects and novel features will be more fully understood and appreciated from the following description of a preferred embodiment of the invention selected for purposes of illustration and shown in the accompanying drawings, in which:

Fig. 1 is a plan view and partial cross-section illustrating a lower portion of the box assembling machine of the invention;

Fig. 2 is an enlarged detail plan view of the power driven mechanism illustrated at the upper left-hand side of Fig. 1;

Fig. 3 is an end elevational view of the machine shown in Fig. 1 and further illustrating diagramatically a box mounted in position to move through the machine;

Fig. 4 is a cross-section taken on the line 4—4 of Fig. 3;

Fig. 5 is a plan cross-section taken on the line 5—5 of Fig. 3 showing a portion of the side belt and box conveyor apparatus;

Fig. 6 is a side elevational view of the box assembling machine further illustrating the power driven conveyor means with a box received thereon;

Fig. 7 is a detail elevational view of a box guide and switch arrangement;

Fig. 8 is a cross-sectional view of a clutch employed in the conveyor drive mechanism;

Fig. 9 is a cross-sectional view of a mutilated gear mechanism forming part of the power driven conveyor means shown in Fig. 6;

Fig. 10 is a cross-sectional view of a torque arrestor means also forming part of the power driven conveyor means of Fig. 6;

Fig. 11 is a cross-section taken on the line 11—11 of Fig. 10;

Fig. 12 is a fragmentary detail plan view of a switch control mechanism responsive to movement of a box into a position to receive staples, and further illustrating diagrammatically the forward end of a box which has moved into contact with the electrical switch means;

Fig. 13 is another fragmentary detail elevational view, partly in cross-section, further illustrating the switch control mechanism of Fig. 12;

Fig. 14 is a development view showing the relative position of timing elements and a mutilated driving gear in the power driven conveyor means of Figs. 1 and 2;

Fig. 15 is a fragmentary detail side view of the side belt guide mechanism of the invention;

Fig. 16 is an elevational view illustrating a box stop and solenoid control device;

Fig. 18 is a perspective view illustrating a bottom section of a box of the collapsible type adapted to be assembled in accordance with the method and apparatus of the invention;

Fig. 19 is another perspective view showing an article of merchandise mounted on the base section of Fig. 18;

Fig. 20 is another perspective view illustrating a tubular box portion expanded upon itself and partly enclosing the article of merchandise shown in Fig. 19;

Fig. 21 is still another perspective view showing the unit of Fig. 20 with a top box section having been put in place and illustrating the box ready to pass through stitching heads of the assembling machine;

Fig. 22 is a detail fragmentary cross-sectional view of a bottom section of the box unit of Fig. 19, showing the cleat and nailing arrangement which is employed in carrying out the stitching operation of the invention;

Fig. 23 is a diagrammatic view illustrative of the step of turning the box about a vertical axis preparatory to receiving a second stapling treatment; and Fig. 24 is a fragmentary detail cross-sectional view showing the bottom cleats secured in stapled relationship at an opposite side of the packing case.

Figure 17:
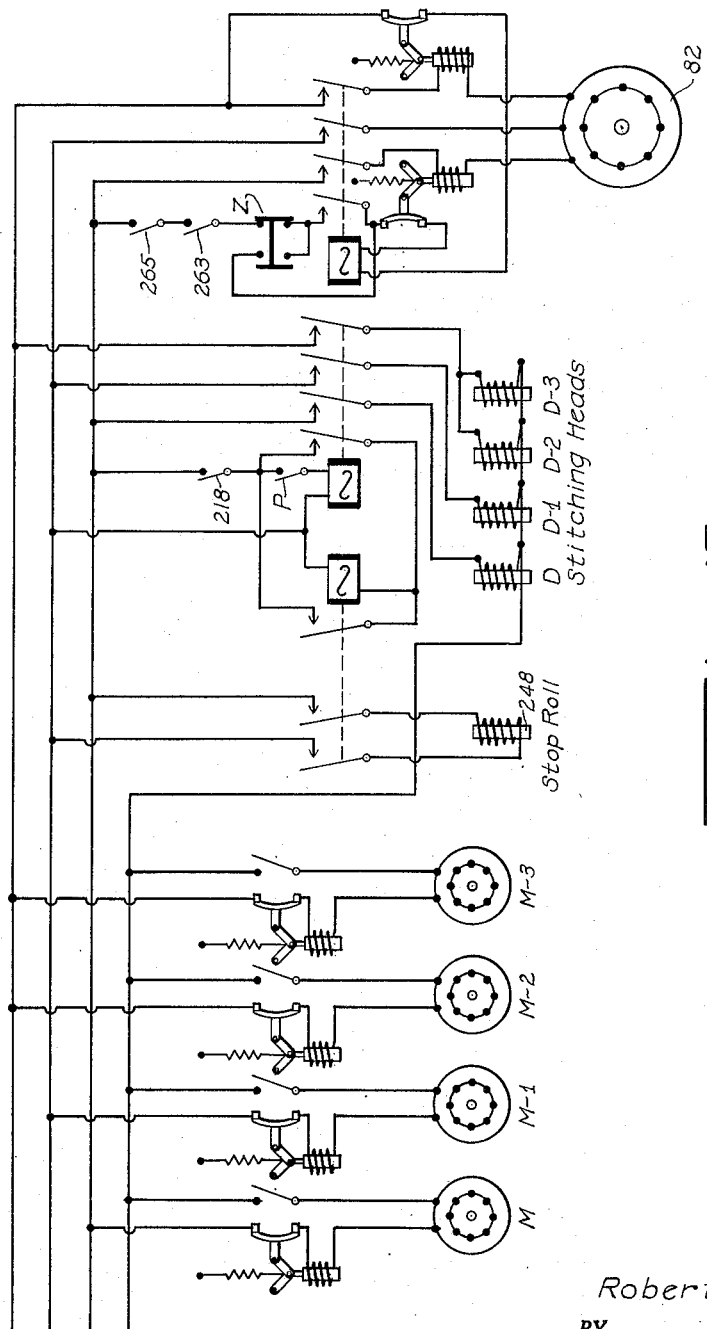
Fig. 17 is a wiring diagram for the electrical components for the conveyor mechanism and the stitching heads.

The principal parts of the box assembling machine of the invention include a box assembling frame; a conveyor device extending through the frame; power driven means for operating the conveyor device; stitching heads arranged in such relationship to the conveyor as to provide for simultaneously applying stitches along two opposite sides of a box assembly carried on the conveyor; and finally, a register mechanism for correctly locating the box in an initial stitching position as well as in a series of predetermined successive stitching positions.

The invention will be described having reference to a specific form of machine, the details of construction of which are directed especially to assembling and securing the box assembly of the above-noted patent. As explained above, this box assembly includes bottom and top box sections and the respective sections also include projecting side cleats. The stitching heads of the present invention are preferably constructed and arranged to drive staples through the tubular body portion of the box into these cleats, as may be better understood from an inspection of Figs. 16—22. However, it should not be understood that the invention is limited to the specific detailed construction of the machine shown in the drawings, nor to the operation of driving staples into a box having this particular cleated type of construction. On the contrary, I may desire to utilize the machine in modified forms and in connection with assembling and stapling various types of box structures where it is desired to apply a series of wire staples or stitches at selected points.

Referring more in detail to the drawings, attention is directed to Figs. 1 to 6, inclusive. The box assembling frame includes base members 2 and 4 which preferably are of a height which will provide for locating the conveyor portions of the machine at a convenient elevation for handling a packing case or for assembling an article of merchandise on a bottom section of such a packing case. Supported on these uprights 2 and 4 are base plates 6 and 8 which, in turn, have solidly secured thereon a pair of spaced-apart frame pieces 10 and 12, better shown in Fig. 1, and arranged in parallel relation to one another to comprise a stitching head channel member.

Mounted on the base plates 6 and 8, and solidly bolted or otherwise secured to the sides of the channel forming members 10 and 12, are two pairs of uprights, including members 14 and 16 at the left-hand side of Fig. 1, and the members 18 and 20 at the right-hand side of Fig. 1. These two pairs of uprights are arranged in spaced-apart relationship to form vertical slideways in which are adjustably supported opposite ends of still another channel member comprised of two channel forming pieces, as 22. One of the pieces 22 has been shown in Fig. 3, and both of these members correspond substantially to the channel forming members 10 and 12 already referred to and better shown in Fig. 1.

The upper channel forming pieces 22 are spaced apart by blocks, as 26, 26', which are provided with vertically extending threaded openings through which are threaded respective adjustment screws 28 and 30 supported in the uprights 14 and 16, as indicated in Fig. 3. At their upper ends, these screws are provided with wheels 32 and 34 by means of which the screws may be turned to raise and lower the channel forming pieces 22 into various vertical positions of adjustment.

In accordance with the invention, I provide in the frame structure described a conveyor device which includes two conveyor belt carrier sections adjustably supported at their intermediate portions just above the channel members 10 and 12, as shown in Figs. 1 and 3. The two conveyor belt carrier sections are designed to be transversely adjustable toward and away from one another in order to accommodate various widths of box assemblies which may be desired to be supported on the conveyor. As illustrative of one suitable means for adjustably mounting the belt carrier sections, I provide a pair of supporting plates 38 and 40 (Fig. 3) which are located immediately above the members 10 and 12. These plates have secured thereto roll members 42 and 44, portions of which are in rolling contact with the upper sides of the members 10 and 12, as may be better seen in Fig. 4 of the drawings.

Mounted on these supporting plates 38 and 40 are the two belt carrier sections referred to above, comprising two sets of spaced-apart angle iron members 46, 48, 50 and 52, between the respective sides of which are supported a set of rollers, as 54, and another set of rollers, 56. These rollers are arranged in spaced-apart relation to one another throughout each of the belt carrier sections, as has been suggested in Fig. 1.

Two endless belts 58 and 60 are mounted around these rolls, as shown in Fig. 1. At their forward extremities, these belts 58 and 60 pass around engaging pulleys 62 and 64 which are slidably keyed on a main driving shaft 66 to provide for adjusting the pulleys toward and away from one another as the conveyor sections are adjusted by the transverse screws. This shaft is supported at its opposite ends in bearings 68 and 70 and, at its central portion, by a bearing 72, all of which bearings are rigidly held by a transverse frame piece 74. The latter frame piece 74 is supported by arms 76 and 78 welded or otherwise secured to one side of the channel forming member 10 at two opposite ends thereof, as shown in Fig. 1.

The conveyor device and its main driving shaft 66 are actuated by power driven means shown at the upper side of Fig. 1 and also in Fig. 2, including an electrical motor 82 which is connected by a clutch 84 to a gear reducer 86. A step feeding mechanism is connected between the output shaft of the gear reducer and the main driving shaft 66 of the conveyor. This step feeding mechanism comprises an intermittent gear drive which includes a gear box 88 having therein a mutilated gear 90, Fig. 9, connected to the gear reducer through a shaft 87. In mesh with the mutilated gear 90 is a gear 92, also shown in Fig. 9 of the drawings. The gear 92 is directly connected through a shaft 93 to a torque arrestor device 94, more clearly shown in Figs. 10 and 11 of the drawings, and including a cushioning element 96 bolted to a main plate portion 96a by suitable fastenings, 96b, as shown in Fig. 11. Directly connected to the torque arrestor is a shaft 98 which carries a sprocket 100 driving a sprocket chain 102 which is, in turn, connected through suitable gearing to a second sprocket drive 104 driving the main shaft 66.

The belt carrier sections of the conveyor, in one preferred embodiment of the invention, may be secured directly to a pair of stitching heads, as shown in the drawings. It should be understood, however, that the stitching heads may, if desired, be operated independently and may be supported independently of any movement of the conveyor device. However, considering the preferred embodiment more in detail, it will be observed that the supporting plates 38 and 40 are utilized to constitute a part of a hanger structure from which a pair of stitching heads are suspended, in the manner shown in Figs. 1 to 5, inclusive. The two stitching heads may be generally denoted by the letters S and S'. In the hanger structure, numerals 110 and 112 denote reinforced plate members which are attached to the plate supports 38 and 40 by means of hanger bolts, as 114 and 116, 118 and 120. These bolts may be tightened to lock the plate members 110 and 112 tightly against the undersides of the channel forming members 10 and 12. When the bolts are loosened, the hanger structures, together with the respective belt carrier sections, are free to be moved on the channel forming members 10 and 12, together with the remainder of the stitching head supporting structure about to be described.

Welded or otherwise secured to the lower plate members 110 and 112 are reinforced stitching head brackets 122 and 124, and to these brackets are bolted respective base portions 126 and 128 of the stitching heads S' and S, respectively. In this way, each of the stitching heads S and S' along one side thereof is firmly supported between two respective channel forming members and is locked together with respective conveyor sections. It is necessary to provide support means for suspending the stitching heads at their outer sides, and this may be done, for example, by providing suspension rods, as 130 and 132, which are anchored at their lower ends to respective housing portions 134 and 136 of the stitching heads, as shown in Fig. 3. The suspension rods 132 and 130 are further provided at their upper extremities with transversely disposed connecting rods, at the ends of which are rotatably mounted rolls 138 and 140. These rolls are located in rolling contact with upper flat surfaces of the channel forming members 10 and 12, and, together with the rolls 42 and 44 already described above, provide for adjustably holding the stitching heads in any desired position of lateral adjustment in the assembly frame. I may also desire to employ suspension rods 132a and 130a connected to the stitching head brackets 122 and 124, as shown in Fig. 4.

In order to facilitate lateral adjustment of the stitching heads, as well as the conveyor sections, and preferably in order to make both adjustments simultaneously, I provide a pair of screws 142 and 144, which are threaded into the blocks 146 and 148 solidly secured to the hanger brackets 110 and 112. The screws extend along the outer sides of the channel forming members 10 and 12 and have their extremities fitted with sprocket gear and chain assemblies indicated by the numerals 150 and 152 which, together with wheels 154 and 156, provide a means for turning the screws and thereby moving the stitching head and conveyor assemblies toward and away from one another, as desired.

The stitching heads S and S' are of the well-known conventional wire stapling type involving a motor driven wire applying mechanism which is controlled by electromechanical means, such as solenoids D and D1, arranged to operate the stitching mechanism in a desired manner. M and M' indicate the motors which operate the stitching heads. Wire for these heads is supplied from spools W and W'. The spools W supply the upper stapling heads and the spools W' supply the lower stapling heads. In the arrangement of the stitching heads described, the staple applying portions of the heads are located adjacent to, and slightly above, the two conveyor sections, as may be readily seen from an inspection of Fig. 3, and in a position such that a box travelling along the belts 58 and 60 may pass in very close proximity to these staple applying portions of the respective stitching heads.

In addition to the stitching heads S and S', I also provide a pair of upper stitching heads A and A', which are mounted in stitching head brackets 160 and 162 and provided with solenoids D2 and D3 and stitching motor M2 and M3. These brackets are mounted immediately above the upper sides of the channel forming members 22 and are supported on rolls, as 164, 166, 168 and 170, corresponding to the rolls described in connection with the lower stitching heads. Similarly, the brackets are adjustably secured by means of plates 172 and 174 through which extend adjustment bolts 176 and 178. These two upper stritching heads may be adjusted toward and away from one another by screws, as 180, operated by wheels 184 and 186, in the manner already described in connection with the lower stitching heads. Similarly, the upper stritching heads are positioned so that the stitch applying portions of the respective heads are correctly aligned with upper edges of the tubular body portion T at such points that the portions may drive stitches through adjacent cleats of the top section of the box.

It is felt that no detailed description of the stapling mechanism, including its motors and pulley drives, all as indicated in the drawings, need be set forth, as this apparatus is well known to those skilled in the art. It may be pointed out, however, that it is customary in these conventional wire stapling or stitching heads to provide a solenoid control for each head. These controls operator to apply one stitch for each time the solenoid is energized. This makes it possible to control a single stitch application so that it may take place once for each revolution of the main driving shaft 66 to thereby produce a timed operation of the stitching heads with the step feeding mechanism described above. It is also pointed out that, in using stapling heads of the conventional character described, it is customary to employ "clinching" bars which rigidly support the work which is to receive the staples. In my improved apparatus, I have eliminated the use of "clinching" bars in a manner hereinafter described.

As shown in Fig. 3, I mount on the conveyor member a box assembly which includes the tubular body portion T, above noted; also a bottom section formed of lower cleats C and upper cleats B, better shown in Fig. 4 and Fig. 18; and a top section having cleats E and F (Figs. 3 and 21). This box assembly may or may not contain an article of merchandise. In the latter case, the item may be bolted, or otherwise secured, to the bottom section of the box. In this connection, it is found that a table may be employed of a height approximately the same as the conveyor belts and this table may be used as a work support on which initial assembling of either of the component parts of the box or the box parts and the merchandise may be carried out with the package thereafter being transferred on to the belts.

In Figs. 3 and 4, a box has been shown without merchandise in it, but it should be understood that it may be desired to have an article of merchandise contained therein. It is also pointed out that in either case the body portion T is fitted around the top and bottom sections of the box and the lower edges of the tubular body portion T, at two sides thereof, are snugly fitted against the bottom cleats C, while the upper edges of the tubular body bear against the cleats E of the top section in the manner also suggested in Figs. 18-24, inclusive. The adjustable hanger structures for the two pairs of stitching heads may be set to position the stitch applying portions of these stitching heads in a correctly elevated position to drive staples through the tubular body portion 2 into the cleats C and E on two sides of the box. Such a position of the respective stitching heads has been indicated in Fig. 3 of the drawings.

It will be apparent that it is important to provide for correctly locating the first wire staple or stitch which is to be driven into the box and thereafter to space the stitches in some predetermined order of spacing. For this purpose, I have devised a pivoted switch arm and electromechanical control mechanism which operates in response to movement of the box to first bring the box up to an initial stitching position and to then arrest forward movement of the box. The box is held stationary for a very short interval and then a cam-operated limit switch completes a circuit through each of the stitching head solenoids and wire staples or stitches are driven into the box.

Simultaneously, the cam-operated limit switch completes a circuit through a release solenoid controlling the box stop and the latter member is retracted out of the path of movement of the box.

Immediately after the stitches are applied, the step-feeding mechanism, acting through the mutilated gear 90, advances the box a predetermined distance and, at definite intervals thereafter, this mechanism operates to step feed the box along a forward path of movement with a stitch being applied on each side of the box during the interval when forward movement is interrupted.

Considering the control mechanism in greater detail, attention is directed to Figs. 1, 12, 13, 15 and 16 and also to the wiring diagram of Fig. 17. From an inspection of the latter figure, it will be seen that the entire mechanism is under the control of the pivoted switch arm, which, in turn, requires the movement of a box along the conveyor in order to be actuated. Therefore, no part of the mechanism, except the main driving motors, can operate unless a box is being fed through the conveyor.

Included in the control mechanism referred to are three novel components which cooperate with one another to locate and hold a box in a properly registered position while wire stitches are applied. These components comprise, in general, a center stop mechanism; a solenoid and switch responsive to the pivoted arm already noted above; and a multiple side belt register device.

Of these three, the side belts are first contacted by a box moving along the conveyor and these side belts constitute an important feature of the invention. One pair of side belts are denoted in the drawings by the numerals 190 and 192, and a second pair of belts are denoted by the numerals 189 and 191.

It has been found that, in dealing with heavy merchandise, such as a crated or boxed refrigerator, for example, difficulty may arise from the crated unit becoming turned about a vertical axis into a position such that its sides are not quite parallel to the planes of the stitching head faces and improperly located stitches may result. If the stitches are not properly located, they may fail to exert the desired holding action or they may be only partly driven into the box, so that they may become partly withdrawn to present sharp ends which constitute a hazard in handling. It will be appreciated that in moving a crated item such as indicated ordinary guide and conveyor apparatus is not always capable of exerting sufficient force to turn the crated item into a proper position of alignment with the stapling heads. The problem is further complicated by the fact that ordinarily the stapling heads are designed to operate against a surface which is supported against backing strips commonly referred to as clinch bars. It will be apparent that there is no opportunity to apply clinch bars in this way when stapling a crated item of merchandise, such as dealt with in present invention.

In accordance with the invention, the use of clinch bars is eliminated and a proper alignment of the box with the stapling heads is positively accomplished at all times. The novel side belt arrangement, above referred to, has been devised to deal with the problem of aligning heavy items and also to rigidly support the box under compression so that clinch bars are not necessary. The side belts operate on the principle of simultaneously exerting relatively large compressive forces on two sides of the box as it comes into contact with a center stop of relatively long bearing surface.

To develop such compressive forces, I provide two pairs of opposed side belts, as 190 and 192, and two other pairs of opposed side belts, 189 and 191, as best shown in Fig. 1. These belts are V-shaped and formed of a compressive material so that they may, when supported around V-type pulleys and exposed to compressive forces, be compressed upon themselves and thereafter exert relatively large forces of reaction which can turn and align very heavy boxes or crates moving on the conveyor belts 58 and 60, above described.

Attention is directed to Figs. 12, 13 and 14 in which I have illustrated a preferred means of mounting one of these side belts. A bearing member, 194, is attached to the member 52 and has vertically disposed therethrough a rotatable shaft 195. At the upper end of the shaft 195 are spaced-apart pulleys of V-channel type, denoted by numerals as 196 and 197. At the lower end of the shaft 195 is a bearing member 198. Fixed to the shaft 195 is a sprocket gear 199 driven by a sprocket chain 200. The latter member is driven by another sprocket gear 201 on another shaft 202 for driving the side belts 189. A bevel gear 204 (Figs. 15 and 4) is driven by another bevel gear 205 on a shaft 206. The latter shaft is geared by bevel gears 207 and 208 to the main drive shaft 66, already noted above. A similar gear arrangement is employed for driving the belts 191 and 192. These side belts on each side of the conveyor are normally set a distance apart from one another, slightly less than the width of a box or crate which is to pass therethrough. This causes the belts to run in a compressed state and to exert reactive forces which turn the box on the conveyor to whatever degree is necessary and, moreover, the box is continuously held during the stop and start operation so that the effect of unbalanced forces in turning the box out of alignment is completely overcome and there is no opportunity for the box to jam in the machine.

As the box passes through the side belts 190 and 192, it comes into contact with the box operated switch arm earlier referred to. This mechanism is best shown in Figs. 12 and 13 and includes a roller 210 pivotally mounted on an arm 211 and extending into the path of movement of the box as diagrammatically suggested in Fig. 12. The arm 211 is adjustably secured to a spring-held lever 212 pivoted at 213 on a bracket 214 in turn secured to the angle iron 52. A spring 215 anchored to a bar 216 normally seeks to keep the roller 210 in the position shown in Fig. 12. A switch support 217 carries a switch 218 having an operating switch element 219 mounted in the path of an actuating arm 220. When the pivoted lever 212 is moved into the dotted-line position shown in Fig. 12, the arm 220 is swung inwardly and operates the switch 218. An adjustable stop 221 provides for varying the setting and swing of the pivoted lever.

In the same circuit with the switch 218 is a solenoid control 248 for the center stop earlier referred to and generally indicated in the drawings by the numeral 230. Also included in this circuit is the manually operated stop and start switch Z which, when closed, caused the main driving motor 82 to run. As best shown in Fig. 16, this stop 230 comprises an elongated roll supported in bearings as 232 on a movable carriage 234 pivoted at 236 in a frame 238 secured below the conveyor belts in a hanger 239 in turn secured to a frame extension 239'. The solenoid coil 248 is also mounted in the frame 238 and has received therethrough a plunger 240 which is normally urged by the spring 242 into a position such as that shown in Fig. 16. When the solenoid is energized, it operates to pull the plunger downwardly, thus dropping the stop 230 below the path of movement of a box on the conveyor belts. Movement of the box over the stop operates to hold this member down as long as the box remains on the conveyor. As soon, however, as the box has passed beyond the stop, then the stop moves upwardly into position to meet the next box which is placed on the conveyor. With the switch 218 closed and with the stop in a holding position and a box received thereagainst in a correctly registered position, the initial stapling operation can be carried out and the stop thereafter retracted.

In accordance with the invention, I provide a special timing mechanism for accomplishing both of these objectives in a correctly timed manner. An important element of the timing mechanism is a cam-operated microswitch, P, which I mount on a bracket P' in turn fastened to the gear reducer 86, as shown in Figs. 1 and 2. This switch is connected in series with switch 218 as shown in Fig. 17. The position of the microswitch P is chosen such that it lies in the path of rotation of a cam member 244 fixed on the shaft member 87 which is driven by the gear reducer. It is pointed out that these switches 218 and P are connected into the circuit which controls operation of the solenoid 248.

The arrangement of the cam switch, although preferably chosen to occur in combination with the main driving mechanism, shown in Fig. 1, might be varied with the switch being mounted at some other convenient point where it could be actuated from the single revolution operation which actuates the entire stitching operation. The particular arrangement of the actuating cam 244 in relation to the mutilated gear 90 is best shown in diagrammatic form in Fig. 14.

It will be seen, therefore, that by means of the arrangement described, the box moves into contact with switch arm 212 and simultaneously registers with the stop. The conveyor comes to rest and the box stop forward movement. Nothing happens for a short interval while the shaft 87 rotates through a predetermined arc which brings the cam 244 into engagement with the switch P. With the latter switch P closed by the cam and with switch 218 being held closed by the presence of the box, the stitching solenoids D, D1, D2 and D3 are energized and operate stitching heads to drive four staples into the box. At the same time, the solenoid 248 is energized and the stop element is thereafter retracted a very short interval after the stitches have been placed.

Further rotation of the shaft 87 causes the mutilated gear 90 to mesh with the gear 92 and to rotate the main driving shaft 66 through the sprocket, above described. This produces a predetermined step feeding of the conveyor belts, together with the side belts and the box as one complete unit into the succeeding stitching position. A similar timing cycle is followed after each step-feeding operation until the box has passed all the way through the stapling heads.

The arrangement of the several solenoids and electrical switches for controlling the various operations above described may be more fully understood from an inspection of the wiring diagram shown in Fig. 17. It is intended that this arrangement may be modified in various ways. It is also pointed out that the driving mechanism for the side belts operates by means of the beveled gear and sprocket arrangement, earlier described, in synchronized relation to the drive for the main conveyor belts. Therefore, the two units operate as one, stopping and starting in the same timed relationship.

It is pointed out that the electrical control circuits are arranged so that the stitching mechanism circuit for operating the solenoids D, D1, D2 and D3 cannot be closed and is completely locked out of operation at all times when the step-feeding mechanism is in operation, and provides a positive safety feature. It may readily be seen that the points at which the first stitches are applied may be varied by changing the position of the stop mechanism, and the spacing at successive points of stitching may also be varied by controlling the timing mechanism and time interval produced by the multilated gear. Furthermore, the mechanism is always under the control of the operator so that he may apply the stitches, one by one, if he so desires, by suitable operation of the switch Z on the main switch panel 15 through which the electrical power supplying the various devices above described is furnished, thus the operator may actuate the conveyor to place the box in an initial stitching position. He may then actuate the stitching solenoids for one revolution operation and then interrupt the electrical circuit which controls these stitching solenoids or he may maintain the circuit in a closed state and provide for successive stitches being placed as the conveyor step feeds the work along the conveyor belt.

It may happen that, due to carelessness in assembling the top section of the box, one side of the top or cover section may become tipped out of a true horizontally located position and, if such a condition develops and the staples are applied, this top section will not be properly secured. Likewise, should the crated item become tipped in some manner so that one edge of the top or cover section of the box is higher than another edge, again the staples would become improperly located at the top of the box. Either one of these two possibilities may, from time to time, develop and make trouble for the machine operator. To deal with this problem, I have further devised electrical switch means responsive to movement of the box to interrupt operation of the machine before an improperly positioned box can move into a register position for receiving staples. I accomplished this end by providing on the front portion of the frame of the machine a pair of flexible arms of which one is shown in Figs. 6 and 7 and denoted by the numeral 251. These arms extend outwardly for an appreciable distance and are formed with curved extremities and normally lie at a height such that a given size of crate will just pass thereunder without forcing the arms upwardly out of the plane of the top section of the box, as may be seen from an inspection of Figs. 6 and 7. Also mounted on the frame immediately above these two flexible arms, as 251, are two switch supports of which one, 255, is shown. These supports carry two switches of which one, 259, is noted in Fig. 7. These switches include contact elements of which one, 263, is noted and indicated in Fig. 7, which are adapted to be operated by lug portions, as 267, fixed to the flexible arms, as shown. Two springs, 253 and 269, normally maintain the members 251 in spaced relation to the members 263 but permit a box in a tilted position to force these members upwardly into contact with the switch elements 263. It will readily be apparent that, by properly setting the flexible arms with respect to the top of a crated item of merchandise, the box will normally pass along the conveyor belts just under the flexible arms 251 without operating the switches 259. However, by selecting a suitably small clearance between the lugs 267 and their respective operating elements it is possible to cause either of the switches 259 to operate in the event that one side or the other of the box is higher than it should be. It will be obvious that this difficulty in height of a box top will occur either from tipping the cover or top section or from the box itself being tipped or tilted.

By connecting the two switches 259 in series with the operating circuit and control switches already described, it will be seen that the entire operation may be discontinued when improper alignment of the box edges occurs and, therefore, faulty application of staples can be prevented. However, at all other times, the operation of the machine, including the limit switch action and the solenoid control stop movement, are not interfered with and can perform their function in the usual manner.

In starting the machine, the electrical circuits are placed in operation in the following manner. Power is supplied from a main supply line of the four-wire type in which the bottom line shown in Fig. 17 is neutral. Between the neutral line and any one of the three other lines, a voltage of 120 volts is available. Between any two of the upper three lines shown in Fig. 17, a voltage of 208 volts is available. Motor 82 is preferably a three-phase motor connected between the three upper lines in the manner common to all three-phase motors.

Closing switches X1, X2 and X3 and X4 on panel 15 shown in Fig. 3 complete a circuit through each of the stitching head motors M, M1, M2 and M3, and these motors start to run with the rest of the apparatus, continuing to remain out of operation up to this point.

To actuate the conveyor mechanism, the switch Z may be closed. This switch provides for a continuous step feeding operation of the conveyor. If, however, only one forwarding step feeding operation is desired, this may be achieved by momentarily depressing switch Z.

Assuming that switch Z is closed for a continuous step feeding operation, then a circuit is completed from the main power line through the switch contacts 263 and 265 (Fig. 17) which are normally closed, although open in the figure noted. The circuit then goes to the switch Z then to the driving motor 82, thus causing the motor to continuously drive the shaft 87. Shaft 87 drives mutilated gear 90 continuously. As long as mutilated gear 90 engages with gear 92, shaft 66 is driven and, through the sprocket chain and gear mechanism shown at the upper left-hand side of Fig. 1, turns shaft 66. This shaft actuates the conveyor mechanism. When, however, the mutilated gear 90 turns out of engagement with the gear 92, then the conveyor mechanism is interrupted.

With the mutilated gear operating as described, the switch 218 at the side of the conveyor mechanism is in a normally open position and also connected in series with the switch 218 is the microswitch P (Fig. 2) which is also in a normally open position. As the driving motor 82 is energized and rotates its driving shaft 87, it moves cam 244 into contact with microswitch P. This microswitch P will, therefore, be periodically closed but, as long as switch 218 continues to remain open, no operation of the solenoids D, D1, D2 and D3 takes place. Thus, the mechanism is safely locked out of operation during all times when a box is not on the conveyor mechanism.

However, when a box is placed on the conveyor mechanism with the above mechanism running as described, the box will be immediately step-fed forwardly until its front edge strikes against the stop roll 230 which causes the box to come to rest momentarily and simultaneously the long bearing surface of the roll cooperates with the tension belts of the conveyor mechanism to square the box in its position of travel. It is pointed out that, during its forward movement into contact with the stop roll 230, the box, through the member 210 earlier described, has closed switch 218. However, an interval occurs during further rotation of the driving shaft until the cam 244 on the driving shaft 87 rotates around into engagement with the switch P, closing this switch member. When this latter switch is closed, a circuit is completed, as may be seen from an inspection of Fig. 17 from the main power line through the switch 218 and switch P through each of the four solenoids D, D1, D2 and D3 and four wire stitches are applied to the box.

At approximately the same point in the time cycle, a circuit is closed through the solenoid 248 and, as will be seen from an inspection of Fig. 17, this solenoid operates to retract the stop roll 230. This immediately permits the conveyor mechanism to step feed the box ahead into a new stitching position. The intermittent operation now described continues as long as the box is on the conveyor mechanism and holds the rolls 210 and 230 in the position described. When the box passes by the roll, the system reverts to continuous movements of the conveyor without any further actuation of the solenoids D, D1, D2 and D3 and, thus, a double safety factor is provided for locking out accidential operation of the solenoids.

The basic wire stitching operation above described provides for securing the tubular body portion T to the top and bottom box sections along two opposite sides. It is, of course, necessary to secure the remaining sides with additional rows of stitches. This may be done in several ways. If desired, the box may be again passed through the conveyor with the unsecured sides turned into position to receive the wire stitches. However, in a preferred method, far more rapid and efficient handling of packing cases may be achieved by providing a second wire stitching frame complete with stitching heads identical to those now described but having a conveyor member running at right angles to the path of movement of the conveyor which has been described. With such an arrangement, a box which has been stitched on two sides may be conveyed to a point where it may be conveniently positioned on the second conveyor with the whole operation being substantially an automatic one.

It is pointed out that, in dealing with cleated top and bottom box sections, such as are shown in the drawings, it is necessary to locate the stitching heads for the second unit in different positions of vertical adjustment in order to secure the body portion T to the cleats F and D, as distinguished from the cleats C and E. This is due to the fact that the former cleats are located transversely above the latter. A suitable vertical adjustment of the stitching heads shown in the drawings may be made by the adjustment means described in connection with these heads.

However, if a second set of stitching heads are employed, they may be permanently set at a higher level to take care of this difference in cleat arrangement. Similarly, various other changes in position and manner of applying the wire staples may be carried out for different types of box constructions which may be encountered. It may be noted in this connection that, in certain instances, the top cleat construction may be eliminated and, in other cases, additional reinforcing members employed for specific types of merchandise to be shipped may also be included with the stitching heads being adjusted so as to secure the body portion to these reinforcing members.

In Figs. 18–24, inclusive, it has been illustrated diagrammatically the several steps which are involved in mounting an article of merchandise on a bottom section of a collapsable type of box, as noted above. The figures also illustrate the several steps of locating a tubular body portion around the article of merchandise, the placing of a top section in position, and the points at which staples or stitches are applied. Thus, in Fig. 18, I have disclosed a box section made up of two bottom cleats, 300 and 302, which support upper cleats 304, 306 and 308 transversely disposed on the bottom cleats, as shown. The bottom section, in effect, comprises a simple pallet structure of the type which is commonly employed for facilitating the handling of articles of merchandise, both during assembly and after manufacture. The bottom section may, therefore, be utilized in the manner suggested in Fig. 18 by placing the base section on a suitable supporting surface which may, for example, comprise the conveyor belts 58 and 60. In such an operation, an article of merchandise which may, for example, consist of a refrigerator 310 is placed on the bottom section in the manner suggested in Fig. 19. It is pointed out, however, that in many instances the refrigerator 310 and the bottom section would be placed upon the conveyor belt as a palletized unit in which the refrigerator would have been bolted to the bottom section during its manufacture or handling at an earlier point.

In Fig. 20, I have illustrated a tubular body portion, 312, being passed down over the refrigerator 310 and, in Fig. 21, I have illustrated the tubular body portion 312 fully seated around the bottom section with the lower edges of the tubular body portion occurring in abutting relationship with respect to the bottom cleats 300 and 302, in a suitable position for receiving fastening elements, such as, wire staples. Also, Fig. 21 illustrates a top section of the box which has been placed within the tubular body portion 12 and which includes cleats 314, 316, 318, 320 and 322. In this recessed position of the top section within the tubular body portion, it will be apparent that staples may be driven through the body portion into these cleats in a suitable manner. Fig. 22 illustrates in cross-section portions of the cleats 300 and 302 through which have been driven fastenings 324 and 326. A series of these fastenings are located in spaced-apart relation along the top and bottom edges of the body portion at two opposite sides thereof. This operation secures the box on two sides only, and thereafter the box may be turned about its vertical central axis, as suggested in Fig. 23, and the box may be again passed through the stitching heads on the conveyor belts described with the entire stitching operation being repeated. I may desire to carry out this second stitching operation in a second stapling unit corresponding in all details to the unit shown in the drawings but extending in a direction at right angles to the path of movement of the conveyor belts 58 and 60.

I may desire to provide with the side belt conveyor arrangement described a means for interrupting the driving force exerted by these side belts in the event of a box becoming badly jammed in the machine as might, for example, occur should a box of too large a width be fed into the machine. As illustrative of one such means, I have provided a slip clutch K, illustrated in Fig. 1 and also, in more detail, in Fig. 8. This clutch consists of a slip member K1 on which are mounted clutch discs K2 and K3 with a sprocket member K4 supported therebetween. This sprocket transmits the driving force of the chain 102 to the shaft 66, as shown in Fig. 1. The discs, K2 and K3, may be forced against one another by means of a spring-pressed plate K5 which can be threaded onto the threaded end of a shaft extension K6, as shown in Fig. 8. By properly selecting the holding force of the plate K5 the frictional grip of the discs may be adjusted so that, when a torque force is exerted on the shaft 66 from interference with the side belts, the discs will slip and further rotative movement of shaft 66 will be interrupted.

From the foregoing description, it will be evident that I have provided a novel method and machine for wire stapling packing cases, particularly those of the plywood variety, which include cleated top and bottom sections. The method and apparatus described are particularly constituted to deal with heavier types of merchandise, such as electric stoves, washing machines, and the like.

Not only can there be realized a very substantial saving in time and labor, but much of the conventional procedure and equipment heretofore employed is eliminated.

While I have shown a preferred embodiment of the invention, it should be understood that various changes and modifications may be practiced in keeping with the scope of the invention as defined by the appended claims.

Having thus described my invention, what I desire to claim as new is:

1. An improved box assembling machine comprising a box assembling frame, conveyor means for supporting and moving a box assembly through the frame, stitching heads arranged at two opposite sides of the frame for applying wire staples to the box assembly while supported in the assembling frame, power driven means for periodically moving the conveyor and box assembly into stitching positions, electromechanical control means for actuating the stitching heads in any one of the stitching positions, said stitching heads consisting of upper and lower pairs arranged in opposed relationship with respect to one another, the said box assembling frame including spaced-apart uprights, said uprights having transversely disposed therebetween upper and lower channel members in which said respective pairs of upper and lower stitching heads are adjustably mounted.

2. A structure as defined in claim 1, including upper and lower screw means located adjacent to said respective channel members for adjusting the positions of the said upper and lower pairs of stitching heads in register with the said box assembly at opposite upper and lower edges thereof.

3. A structure as defined in claim 1, including upper and lower screw means located adjacent to the respective channel members for adjusting the positions of the said upper and lower pairs of stitching heads, said screw means including roll members transversely disposed across the said channel members for rolling engagement therewith, suspension brackets solidly secured to said stitching heads and movable with the said rolls, and screw elements threaded through respective suspension brackets.

4. A structure as defined in claim 1, including means for simultaneously aligning two opposite vertical surfaces of the box in parallel registration with respective stitching heads.

5. A structure as defined in claim 1, including a plurality of sets of guide belts located at either side of the conveyor means on pulleys which rotate about vertical axes, said guide belts being constructed and arranged to simultaneously exert compressive forces against two sides of a box on the conveyor means for turning the box into a correctly registered position, and an elongated stop member supported centrally in the conveyor mechanism in the path of travel of the box, said elongated stop cooperating with the guide belts to arrest the box in a correctly aligned position.

6. A structure as defined in claim 1, including guide means for detecting displacement of the top surface of the box out of a horizontal plane during its movement on the conveyor, and electrical means responsive to the said guide means for interrupting operation of the stitching heads.

7. A structure as defined in claim 1, including a pair of spaced-apart guide shoes resiliently supported in the frame in a position to normally slide over the top surface of a box moving along the conveyor, and switch means responsive to movement of the guides induced by displacement of the top surface of the box out of a horizontal plane, and said switch means being adapted to interrupt operation of the stitching heads.

8. A structure as defined in claim 1, including aligning means for aligning two opposite vertical surfaces of the box in parallel registration with respective stitching heads, and guide means operating simultaneously with the said aligning means for detecting displacement of the top surface of the box out of a horizontal plane, and electrical means responsive to the said guide means for interrupting operation of the stitching heads.

9. A structure as defined in claim 1, including aligning means for aligning two opposite vertical surfaces of the box in parallel registration with respective stitching heads, an elongated stop adjustably supported centrally of the conveyor, said stop cooperating with the aligning means to arrest the box with two opposite vertical sides in a correctly aligned position, and guide means cooperating with the aligning means and elongated stop for preserving registration of a top surface of the box in a horizontal plane when the stitching heads are actuated.

10. An improved box assembly machine comprising a box assembling frame, conveyor means for supporting and moving a box assembly through the frame, stitching heads arranged at two opposite sides of the frame for applying wire staples to the box assembly while supported in the assembling frame, power driven means for periodically moving the conveyor and box assembly into stitching positions, electromechanical control means for actuating the stitching heads in any one of the stitching positions, said stitching heads consisting of upper and lower pairs arranged in opposed relationship with respect to one another, the said box assembling frame including spaced-apart uprights, said uprights having transversely disposed therebetween upper and lower channel members in which said respective pairs of upper and lower stitching heads are adjustably mounted, a plurality of sets of guide belts located at either side of the conveyor means, said guide belts being constructed and arranged to simultaneously exert compressive forces against two sides of a box on the conveyor means and turn the box into a correctly registered position, an elongated stop member supported centrally in the conveyor mechanism in the path of travel of the box, said elongated stop cooperating with the guide belts to arrest the box in a correctly aligned position, means for actuating the stitching heads to apply staples to opposite upper and lower sides of the box while at rest against said elongated stop, electromechanical means responsive to movement of the box for controlling the means for actuating the stitching heads, and said electromechanical means including a device for retracting the elongated stop after the stitching heads have been initially actuated.

11. A structure as defined in claim 10 in which the electromechanical means includes a switch operating arm located at one side of the conveyor and projecting into the path of movement of the box thereby to prevent accidental operation of the stitching heads after a box leaves the conveyor.

References Cited in the file of this patent

UNITED STATES PATENTS

| | | |
|---|---|---|
| 309,297 | Foster | Dec. 16, 1884 |
| 611,214 | Green | Sept. 20, 1898 |
| 1,496,316 | Jackson | June 3, 1924 |
| 2,024,750 | Sims | Dec. 17, 1935 |
| 2,070,704 | Anderson | Feb. 16, 1937 |
| 2,092,099 | Twomley | Sept. 7, 1937 |
| 2,097,499 | Newhouse | Nov. 2, 1937 |
| 2,113,360 | Tate | Apr. 5, 1938 |
| 2,228,134 | Ecklund | Jan. 7, 1941 |
| 2,486,893 | Van Doren | Nov. 1, 1949 |
| 2,569,355 | Tubbs | Sept. 25, 1951 |
| 2,651,036 | Stilwell | Sept. 8, 1953 |